(12) United States Patent
Park et al.

(10) Patent No.: US 9,193,897 B2
(45) Date of Patent: Nov. 24, 2015

(54) COMPOSITION FOR ANTIFREEZE LIQUID OR COOLANT HAVING SUPERIOR CAVITATION EROSION- AND GAP CORROSION-RESISTANCE EFFECT

(75) Inventors: Jae Yoon Park, Seoul (KR); Chang Yeol Jo, Busan (KR); Dong Yeol Choi, Gyeonggi-do (KR)

(73) Assignee: KUKDONG JEYEN COMPANY LIMITED, Gyeonggi-do (KR)

( * ) Notice: Subject to any disclaimer, the term of this patent is extended or adjusted under 35 U.S.C. 154(b) by 0 days.

(21) Appl. No.: 14/346,718

(22) PCT Filed: Jan. 31, 2012

(86) PCT No.: PCT/KR2012/000754
§ 371 (c)(1),
(2), (4) Date: Mar. 22, 2014

(87) PCT Pub. No.: WO2013/042838
PCT Pub. Date: Mar. 28, 2013

(65) Prior Publication Data
US 2014/0223930 A1    Aug. 14, 2014

(30) Foreign Application Priority Data
Sep. 23, 2011  (KR) .................... 10-2011-0096271

(51) Int. Cl.
*C09K 5/20* (2006.01)
*C23F 11/10* (2006.01)
*C23F 11/12* (2006.01)

(52) U.S. Cl.
CPC . *C09K 5/20* (2013.01); *C23F 11/10* (2013.01); *C23F 11/122* (2013.01); *C23F 11/124* (2013.01)

(58) Field of Classification Search
CPC combination set(s) only.
See application file for complete search history.

(56) References Cited

U.S. PATENT DOCUMENTS

| 4,869,841 A * | 9/1989 | Matteodo et al. ............... 252/79 |
| 2007/0007489 A1 | 1/2007 | Egawa et al. |
| 2009/0294102 A1 | 12/2009 | Yang et al. |

FOREIGN PATENT DOCUMENTS

| KR | 10-2010-0018754 A | 2/2010 |
| KR | 10-2011-0040873 A | 4/2011 |

OTHER PUBLICATIONS

International Search Report for PCT/KR2012/000754.

* cited by examiner

*Primary Examiner* — Necholus Ogden, Jr.
(74) *Attorney, Agent, or Firm* — Vorys, Sater, Seymour and Pease LLP

(57) ABSTRACT

The present invention relates to a composition for an antifreeze liquid or a coolant. The present invention provides the composition for the antifreeze liquid or the coolant comprising: (a) a glycol-based antifreeze agent; (b) a cyclo hexane dicarboxylic acid; and (c) a non-reduced polyol. Generally, a mixture of mono- or dicarboxylic acid, which is used as a corrosion inhibitor agent, and an inorganic additive is prone to cavitation erosion and corrosion of gaps, but when a composition is comprised by using in parallel the cyclo hexane dicarboxylic acid and the non-reduced polyol, a synergy effect is created, thereby exhibiting a superior corrosion prevention effect with respect to cavitation erosion and corrosion of gaps inside a cooling apparatus.

12 Claims, 2 Drawing Sheets

FIG. 2

COMPOSITION FOR ANTIFREEZE LIQUID OR COOLANT HAVING SUPERIOR CAVITATION EROSION- AND GAP CORROSION-RESISTANCE EFFECT

CROSS REFERENCE TO RELATED APPLICATIONS AND CLAIM OF PRIORITY

This patent application claims benefit under 35 U.S.C. 119(e), 120, 121, or 365(c), and is a National Stage entry from International Application No. PCT/KR2012/000754, filed 31 Jan. 2012, which claims priority to Korean Patent Application No. 10-2011-0096271, filed 23 Sep. 2011, entire contents of which are incorporated herein by reference.

BACKGROUND

1. Technical Field

The present invention relates to a composition for an antifreeze or a coolant, including: (a) a glycol-based anti-freezing agent; (b) cyclohexane dicarboxylic acid; and (c) non-reducing polyol.

2. Background Art

Generally, a composition for an antifreeze or a coolant mainly consists of ethylene glycol or propylene glycol. The composition contains, as main components, a carboxylic additive and an organic material, in order to prevent corrosions of aluminum- and iron-based parts. A water pump is used to circulate a cooling water in a cooling system. Here, cavitation erosion due to metal erosion may occur on an impeller of the water pump, which rotates at high speed/high temperature. Moreover, a coolant tends to infiltrate into a gap between a non-metal material and a metal material, which is generated when a line made of a non-metal material such as rubber or plastic is coupled with a line made of a metal material in the cooling system, and a narrow gap inside the cooling system, thereby accelerating gap corrosion therebetween. Since only the combination of aliphatic and aromatic carboxylic acids had a little effect in preventing cavitation erosion and gap corrosion in the vehicle engine cooling system, non-reducing polyol was further used.

U.S. Pat. No. 4,869,841 discloses that, in order to improve overall anti-corrosive performance on alloy and metal parts as heat transfer media, aliphatic dicarboxylic acid and polyol are used to enhance the anti-corrosive performance on metal materials through the ASTM D 1384 metal corrosion test, but fails to disclose anti-corrosive performance against cavitation erosion and gap corrosion. An anti-corrosive composition for anti-corrosion against cavitation erosion and gap corrosion, which occur in a circulation procedure at high speed in the cooling system, has been requested.

Throughout the entire specification, many patent documents are referenced and their citations are represented. The disclosures of cited patent documents are entirely incorporated by reference into the present specification, and the level of the technical field within which the present invention falls and details of the present invention are explained more clearly.

SUMMARY

The present inventors endeavored to develop an antifreeze or a coolant for enhancing the anti-corrosive performance against cavitation erosion- and gap corrosion. As a result, the present inventors established that a combination of cyclohexane dicarboxylic acid and non-reducing polyol in the composition contained in an antifreeze or a coolant exhibits superior effects in preventing corrosion of metal parts, cavitation erosion, and gap corrosion in a cooling system for a vehicle, and then completed the present invention.

Accordingly, an aspect of the present invention is to provide a composition for an antifreeze or a coolant.

Other purposes and advantages of the present disclosure will become clarified by the following detailed description of invention, claims, and drawings.

In accordance with an aspect of the present invention, there is provided a composition for an antifreeze or a coolant, the composition including: (a) a glycol-based anti-freezing agent; (b) cyclohexane dicarboxylic acid; and (c) non-reducing polyol.

BRIEF DESCRIPTION OF THE DRAWINGS

FIG. 2 depicts digital microscopic images showing gap corrosion of aluminum castings after the gap corrosion test for Examples 1 and 2 and Comparative Examples 1 and 2.

DETAILED DESCRIPTION

Figure 1:
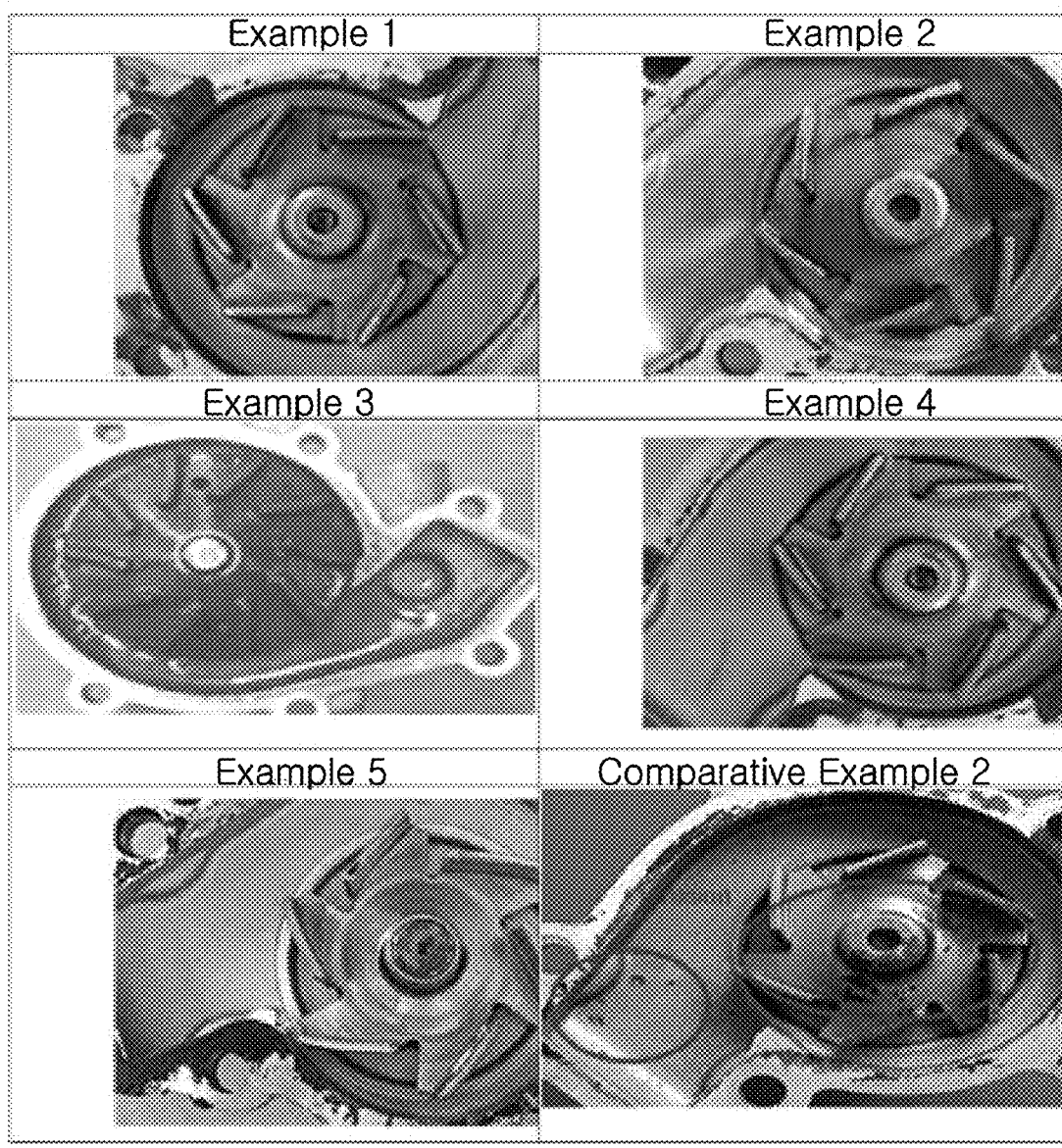
FIG. 1 depicts images showing appearances of water pumps after the cavitation erosion test for Examples 1 to 5 and Comparative Example 2.

The present inventors endeavored to develop an antifreeze or a coolant for enhancing the anti-corrosive performance against cavitation erosion and gap corrosion. As a result, the present inventors established that a combination of cyclohexane dicarboxylic acid and non-reducing polyol in the composition contained in an antifreeze or a coolant exhibits superior effects in preventing corrosion of metal parts, cavitation erosion, and gap corrosion in a cooling system for a vehicle.

The composition of the present invention includes: (a) a glycol-based anti-freezing agent; (b) cyclohexane dicarboxylic acid; and (c) non-reducing polyol. The contents of the components used in the present invention are not particularly limited. Preferably, the composition includes 85-98 wt % of the glycol-based anti-freezing agent, 0.1-13.0 wt % (more preferably, 0.1-6.0 wt %) of the cyclohexane dicarboxylic acid, and 0.05-2.0 wt % of the non-reducing polyol.

The composition of the present invention generally contains glycol used as an anti-freezing agent. The glycol serves to prevent the freezing and bursting of engines and cooling systems, and includes one or a mixture of two or more selected from the group consisting of ethylene glycol, propylene glycol, diethylene glycol, dipropylene glycol, glycerin, triethylene glycol, tripropylene glycol, 1,3-butylene glycol, and hexylene glycol. The use content of the glycol is preferably 85-98 wt %. Less than 85 wt % of the glycol may cause the freezing and bursting of engines and cooling systems at sub-zero temperatures in the winter, and may cause the boiling of the coolant in the engines at high outdoor temperatures in the summer. On the other hand, more than 98 wt % of the glycol may cause a scarcity of anti-corrosive agent, resulting in a difficulty in performing the long-term anti-corrosive capability.

According to a preferable embodiment of the present invention, the composition of the present invention further includes at least one anti-corrosive agent selected from the group consisting of $C_4$-$C_{18}$ organic carboxylic acids and alkali salts thereof, phosphoric acid and phosphates thereof, azole derivatives and thiazole derivatives, and barium and barium compounds.

The use content of the anti-corrosive agent is not particularly limited, but preferably 1-20 parts by weight based on 100 parts by weight of the glycol-based anti-freezing agent.

The $C_4$-$C_{18}$ organic carboxylic acid or alkali salt thereof used in the composition of the present invention is: at least one selected from the group consisting of adipic acid, suberic acid, glutaric acid, neodecanoic acid, neooctanoic acid, succinic acid, cinnamic acid, azelaic acid, methyl cinnamic acid, hydroxy cinnamic acid, cinnamic acid ethyl, propyl cinnamic acid, butyl cinnamic acid, ethoxy cinnamic acid, ethyl benzoic acid, propyl benzoic acid, pimelic acid, dicyclopentadiene dicarboxylic acid, undecanoic acid, benzoic acid, nonanoic acid, phthalic acid, decanoic acid, terephthalic acid, dodecanoic acid, methyl benzoic acid, hexanoic acid, cyclohexenoic acid, 2-ethylhexanoic acid, sebacic acid, decane dicarboxylic acid, t-butyl benzoic acid, octanoic acid, and heptanoic acid; more preferably at least one selected from the group consisting of succinic acid, cinnamic acid, benzoic acid, 2-ethylhexanoic acid, sebacic acid, decane dicarboxylic acid, and t-butyl benzoic acid; and most preferably at least one selected from the group consisting of sebacic acid, decane dicarboxylic acid, and t-butyl benzoic acid.

The phosphoric acid or phosphate thereof used in the composition of the present invention is: phosphoric acid, orthophosphoric acid, sodium phosphate, potassium phosphate, sodium monohydrogen phosphate, potassium monohydrogen phosphate, sodium dihydrogen phosphate, or potassium dihydrogen phosphate; more preferably phosphoric acid, sodium phosphate, or potassium phosphate; and most preferably phosphoric acid.

The azole or thiazole derivative used as an anti-corrosive agent on copper or brass in the composition of the present invention exhibits anti-corrosive capability on copper alloy parts inside the cooling system. Here, the azole or thiazole derivative is: one or a mixture of two or more selected from the group consisting of tolyltriazole, benzotriazole, 4-phenyl-1,2,3-triazole, 2-naphthotriazole, 4-nitrobenzotriazole, and 2-mercaptobenzotriazole; and preferably one or a mixture of two or more selected from the group consisting of tolyltriazole and benzotriazole.

The barium or barium compound used in the composition of the present invention is preferably one or a mixture of two or more selected from the group consisting of barium, barium chloride, barium hydroxide, barium nitrate, barium carbonate, barium acetate, barium sulfate, barium bromate, barium thiocyanate, barium titanate, barium fluoride, barium cyanate, barium benzene sulfonate, barium bromide.

According to a preferable embodiment of the present invention, the cyclohexane dicarboxylic acid used as an anti-corrosive agent on aluminum- and iron-based parts in the composition of the present invention serves to protect various kinds of metallic parts inside the cooling system against corrosion for a long time. Here, one or a mixture of two or more selected from the group consisting of 1,4-cyclohexane dicarboxylic acid, 1,3-cyclohexane dicarboxylic acid, and 1,2-cyclohexane dicarboxylic acid may be used. The use content of the cyclohexane dicarboxylic acid contained in the composition of the present invention is preferably 0.1-13.0 wt %, and more preferably 0.1-6.0 wt %. If the content of the cyclohexane dicarboxylic acid is less than 0.1 wt %, such a small content cannot give an expectation of sufficient anti-corrosive effects on the aluminum- and iron-based parts. If the content of the cyclohexane dicarboxylic acid is more than 13.0 wt %, such an excessive content may cause a deterioration in the liquid stability, an excessive time for dissolution, and a decrease in economic feasibility.

According to a preferable embodiment of the present invention, the non-reducing polyol used in the composition of the present invention includes sorbitol, xylitol, mannitol, or saccharose. As used herein, the term "polyol" means sugar alcohol of $CH_2OH$—$(CHOH)_n$—$CH_2OH$ and its anhydride dimer. The non-reducing polyol used in the composition of the present invention is selected from hexitol having six carbon atoms, e.g., sorbitol and mannitol; pentatol having five carbon atoms, e.g., xylitol; and polymeric alcohol having 12 carbon atoms, e.g., saccharose. Most preferably, one or a mixture of two or more selected from the group consisting of mannitol, sorbitol, and xylitol may be used. The use content of the non-reducing polyol is preferably 0.05-2.0 wt %. If the content of the non-reducing polyol is less than 0.05 wt %, such a small content cannot give an expectation of sufficient anti-corrosive effects against cavitation erosion and gap corrosion. If the content of the non-reducing polyol is more than 2.0 wt %, such an excessive content may cause a deterioration in the liquid stability and induce cavitation erosion and gap corrosion, thereby having an adverse effect in the long-term corrosion prevention.

The composition for an antifreeze or a coolant of the present invention may further include a pH adjuster, a dye, or a defoaming agent. The pH adjuster may include alkali metal hydroxide, and may be preferably potassium hydroxide or sodium hydroxide.

As described above, the main characteristic of the present invention is to provide an antifreeze or a coolant having excellent effects in preventing corrosion of metal parts, cavitation erosion, and gap corrosion in the cooling system for a vehicle, by combining cyclohexane dicarboxylic acid and non-reducing polyol.

Features and advantages of the present invention are summarized as follows:

(a) The present invention provides a composition for an antifreeze or a coolant, the composition including cyclohexane dicarboxylic acid, and, as an additive, non-reducing polyol.

(b) The combination of mono- or di-carboxylic acid used as an anti-corrosive agent with an inorganic additive may generally cause cavitation erosion and gap corrosion. However, the combination of cyclohexane dicarboxylic acid and non-reducing polyol in the composition leads to a synergy effect thereof, thereby having excellent effects in preventing cavitation erosion and gap corrosion in the cooling system due to a synergic effect thereof.

Hereinafter, the present invention will be described in detail with reference to examples. These examples are only for illustrating the present invention more specifically, and it will be apparent to those skilled in the art that the scope of the present invention is not limited by these examples.

EXAMPLES

Throughout the present specification, the term "%" used to express the concentration of a specific material, unless otherwise particularly stated, refers to (wt/wt) % for solid/solid, (wt/vol) % for solid/liquid, and (vol/vol) % for liquid/liquid.

Preparative Example 1

Preparation of Antifreeze/Coolant of Examples 1 to 5

The present inventors used 90-95 wt % of glycol (e.g., ethylene glycol) as a main component for preparation of an antifreeze or a coolant. 1.0-6.0 wt % of cyclohexane dicarboxylic acid was used as an anti-corrosive agent for aluminum- and iron-based materials, and 0.1-0.5 wt % of azole or thiazole was used as an anticorrosive agent for copper and brass materials. The present invention is characterized in that the combination of cyclohexane dicarboxylic acid and non-reducing polyol was used to improve the effects in preventing cavitation erosion and gap corrosion. The non-reducing polyol [mannitol (Basf, Germany), sorbitol (Kanto Chemical, Japan), or xylitol (Sigma-Aldrich, Canada)] was used in a content of 0.1-0.5 wt %. Specifically, compositions of examples and comparative examples of the present invention were prepared by weighing components of which contents are shown in Table 1 below, putting ethylene glycol into the container, and then heating the solution to reach a temperature of 40-60° C. while stirring was conducted for a homogeneous solution.

dissolved in 1 l of distilled water) to reach concentrations of 50 vol %, respectively. Two sets of metal test specimens were installed. The discharge pressure of the water pump was 1.6 kgf/cm$^2$. The rotational speed of the water pump impeller was 88000±100 RPM. The temperature of liquid was 110±5° C. The operating time was 672 hours. As another method, the concentrations of compositions were 30 volt, respectively, and two sets of metal specimens were installed. The discharge pressure of the water pump was 1.0 kgf/cm$^2$. The rotational speed of the water pump impeller was 5500±100 RPM. The temperature of liquid was 95±5° C. The operating time was 1,008 hours. Upon the completion of each test, the test speci-

TABLE 1

Compositions of examples and comparative examples

| Component (wt %) | Example | | | | | Comparative example | | | | |
|---|---|---|---|---|---|---|---|---|---|---|
| | 1 | 2 | 3 | 4 | 5 | 1 | 2 | 3 | 4 | 5 |
| Ethylene glycol | 92.82 | 91.60 | 91.55 | 91.72 | 91.30 | 93.12 | 92.90 | 92.05 | 92.12 | 91.70 |
| t-butyl benzoic acid | 1.0 | 1.2 | 1.0 | 1.0 | 1.0 | 1.0 | 1.2 | 1.0 | 1.0 | 1.0 |
| Sebacic acid | 2.0 | 2.0 | 1.8 | 2.0 | 2.0 | 2.0 | 2.0 | 1.8 | 2.0 | 2.0 |
| Decanedicarboxylic acid | 0.5 | — | 1.0 | 0.5 | 0.5 | 0.5 | — | 1.0 | 0.5 | 0.5 |
| Cyclohexanedicarboxylic acid | 1.2 | 1.5 | 1.2 | 1.2 | 1.2 | 1.2 | 1.5 | 1.2 | 1.2 | 1.2 |
| Tolyltriazole | 0.2 | 0.2 | 0.2 | 0.2 | 0.2 | 0.2 | 0.2 | 0.2 | 0.2 | 0.2 |
| Benzotriazole | 0.2 | 0.2 | 0.2 | 0.2 | 0.2 | 0.2 | 0.2 | 0.2 | 0.2 | 0.2 |
| 2-mercaptobenzothiazole | — | — | — | 0.1 | 0.1 | — | — | — | 0.1 | 0.1 |
| Mannitol | 0.3 | — | — | 0.2 | 0.2 | — | — | — | — | — |
| Sorbitol | — | 0.3 | — | — | 0.2 | — | — | — | — | — |
| Xylitol | — | — | 0.5 | 0.2 | — | — | — | — | — | — |

Test Example 1

Cavitation Erosion Test

For a cavitation erosion test, the compositions of examples and comparative examples were mixed with combination water defined in the ASTM D 1384 metal corrosion test (solution in which sulfuric anhydride 148 mg, sodium chloride 165 mg, and sodium hydrogen carbonate 138 mg are dissolved in 1 l of distilled water) to reach concentrations of... mens were washed with acid. The weight changes of the test specimens were determined in the error range of 0.1 mg. The water pump was disassembled, and the degree of cavitation erosion was measured by utilizing a table of grading specified according to the ASTM D 2809. The results were tabulated in Table 2 below, and the appearances of the water pumps after the test for Examples 1 to 5 and Comparative Example 2 were shown in FIG. 1.

TABLE 2

Water pump test results

| Test item | | Standard | Example | | | | | Comparative example | | | | |
|---|---|---|---|---|---|---|---|---|---|---|---|---|
| | | | 1 | 2 | 3 | 4 | 5 | 1 | 2 | 3 | 4 | 5 |
| Weight change of test specimen (mg/cm$^2$) 50%, 98° C., 672 hours | Aluminum | ±0.15 | −0.06 | −0.05 | −0.06 | −0.07 | −0.04 | −0.15 | −0.14 | −0.14 | −0.16 | −0.16 |
| | Cast ion | ±0.15 | +0.02 | −0.02 | +0.03 | −0.02 | +0.03 | −0.09 | +0.07 | +0.12 | +0.15 | −0.15 |
| | Steel | ±0.15 | −0.01 | +0.02 | −0.02 | −0.02 | −0.02 | −0.07 | −0.10 | +0.08 | −0.07 | +0.07 |
| | Brass | ±0.15 | −0.02 | −0.02 | +0.03 | −0.02 | −0.06 | −0.11 | −0.12 | +0.14 | −0.15 | −0.13 |
| | Solder | ±0.15 | −0.10 | −0.08 | −0.08 | −0.09 | −0.10 | −0.14 | −0.18 | −0.17 | −0.15 | −0.17 |
| | Copper | ±0.15 | −0.04 | −0.03 | −0.04 | −0.03 | −0.02 | +0.05 | −0.04 | +0.05 | −0.06 | +0.04 |
| Appearance of test specimen | | | Not corroded | | | | | Not corroded | Solder corroded | Not corroded | Not corroded | Solder corroded |
| Appearance grade of impeller of water pump | | | 9 | 9 | 10 | 9 | 10 | 7 | 5 | 7 | 5 | 6 |

TABLE 2-continued

Water pump test results

| Test item | | Standard | Example | | | | | Comparative example | | | | |
|---|---|---|---|---|---|---|---|---|---|---|---|---|
| | | | 1 | 2 | 3 | 4 | 5 | 1 | 2 | 3 | 4 | 5 |
| Weight change of test specimen (mg/cm$^2$) 30%, 95° C., 1,008 hours | Aluminum | ±0.15 | −0.08 | −0.09 | −0.09 | −0.07 | −0.04 | −0.14 | −0.14 | −0.13 | −0.18 | −0.15 |
| | Cast ion | ±0.15 | +0.05 | −0.03 | +0.05 | −0.02 | +0.03 | −0.10 | −0.11 | −0.11 | +0.10 | −0.12 |
| | Steel | ±0.15 | −0.03 | −0.04 | +0.04 | −0.02 | −0.02 | −0.09 | −0.08 | +0.09 | −0.10 | +0.09 |
| | Brass | ±0.15 | −0.06 | −0.07 | −0.05 | +0.06 | −0.06 | −0.13 | −0.12 | −0.13 | −0.12 | −0.14 |
| | Solder | ±0.15 | −0.12 | −0.11 | −0.13 | −0.09 | −0.10 | −0.14 | −0.13 | −0.15 | −0.13 | −0.16 |
| | Copper | ±0.15 | −0.07 | −0.05 | −0.07 | +0.03 | −0.04 | −0.12 | +0.11 | +0.13 | −0.14 | +0.11 |
| Appearance of test specimen | | | Not corroded | | | | | Solder, aluminum, and cast iron corroded | Solder and cast iron corroded | Solder corroded | Solder and cast iron corroded | Solder and aluminum corroded |
| Appearance grade of impeller of water pump | | | 9 | 9 | 10 | 9 | 10 | 7 | 5 | 7 | 5 | 6 |

As can be seen from Table 2 above, in the cavitation erosion test results under conditions of 50%, 110° C., and 672 hours, the compositions of the examples showed no corrosion on aluminum, cast iron, steel, brass, solder, and copper, while the compositions of Comparative Examples 2 and 5 showed corrosion on only solder. However, in the cavitation erosion test results under conditions of 30%, 95° C., and 1,008 hours, the compositions of the examples exhibited satisfactory anti-corrosive performance, while the compositions of the comparative examples showed corrosion on solder, aluminum, and cast iron, resulting in poor performance of preventing cavitation erosion for a long time at a concentration of 30%. As can be seen from Table 1 and FIG. 1, the compositions of the present examples exhibited more excellent performance of preventing erosion of the water pump impeller due to cavitation and relatively lower changes in metal weight than the compositions of the comparative examples. Therefore, it can be seen that the compositions of the present invention also exhibited great effects in the performance of preventing metal corrosion.

Test Example 2

Gap Corrosion Test

For a gap corrosion test, the compositions of examples and comparative examples were mixed with combination water defined in the ASTM D 1384 metal corrosion test (solution in which sulfuric anhydride 148 mg, sodium chloride 165 mg, and sodium hydrogen carbonate 138 mg are dissolved in 1 l of distilled water) to reach concentrations of 33 vol %, respectively. In a 1 l glass tall beaker, a fluoroelastomer sheet was positioned between an aluminum casting with grooves and an aluminum casting without grooves, which were then immersed in the solution such that the solution uniformly infiltrated into the grooves. The operation was conducted at 100° C. for 672 hours. The gap corrosion of the aluminum castings was observed by a digital microscope. The results were tabulated in Table 3 below, and appearances of impellers for the examples and Comparative Examples 1 and 2.

TABLE 3

Results on gap corrosion test

| Test item | Standard | Example | | | | | Comparative example | | | | |
|---|---|---|---|---|---|---|---|---|---|---|---|
| | | 1 | 2 | 3 | 4 | 5 | 1 | 2 | 3 | 4 | 5 |
| Appearance of groove of aluminum casting | | Not corroded | | | | | Partially corroded | Partially corroded | Corroded | Corroded | Corroded |

Figure 2:
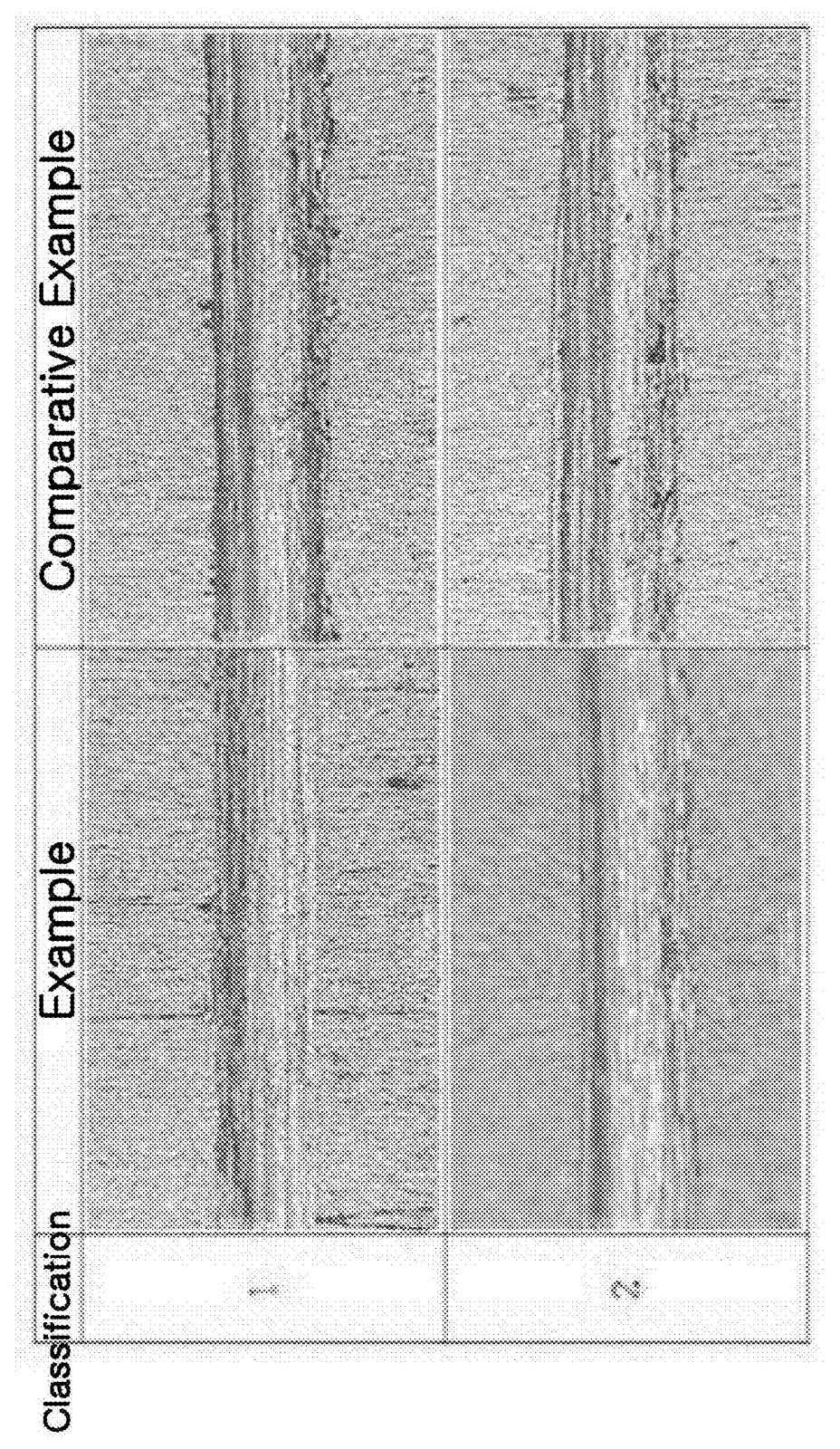

As can be seen from Table 3 and FIG. 2, the compositions of the examples showed no gap corrosion on the aluminum castings and exhibited excellent anti-corrosive effects, but the compositions of the comparative examples showed gap corrosion on the aluminum castings. Therefore, it can be seen that the combination of cyclohexane dicarboxylic acid and non-reducing polyol exhibited performance of preventing gap corrosion.

The composition of the present invention exhibited excellent anti-corrosive effects against cavitation erosion and gap corrosion due to a synergy effect by the combination of cyclohexane dicarboxylic acid and non-reducing polyol. It can be seen that the long-term durability of the antifreeze was enhanced from the enhancement in anti-corrosive performance for internal metal materials in the cooling system, the improvement in durability against cavitation erosion of aluminum, and the enhancement in the anti-corrosive performance on the rotating water pump.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

The invention claimed is:

1. A composition for an antifreeze or a coolant, the composition comprising: (a) a glycol-based anti-freezing agent; (b) cyclohexane dicarboxylic acid; and (c) non-reducing polyol selected from the group consisting of hexitol, pentitol, $C_{12}$ alcohols and their combination; wherein the cyclohexane dicarboxylic acid is one or a mixture of two or more selected from the group consisting of 1,4-cyclohexane dicarboxylic acid, 1,3-cyclohexane dicarboxylic acid, and 1,2-cyclohexane dicarboxylic acid.

2. The composition of claim 1, further comprising at least one anti-corrosive agent selected from the group consisting of $C_4$-$C_{18}$ organic carboxylic acids and alkali salts thereof, phosphoric acids and phosphates thereof, azole derivatives and thiazole derivatives, and barium and barium compounds.

3. The composition of claim 1, wherein the reducing polyol is sorbitol, xylitol, mannitol, or saccharose.

4. The composition of claim 3, wherein the reducing polyol is mannitol.

5. The composition of claim 1, wherein the composition prevents cavitation erosion of aluminum, cast iron, steel, brass, solder, and copper under the conditions of ASTM D 1384.

6. The composition of claim 1, wherein the composition prevents gap corrosion of aluminum, cast iron, steel, brass, solder, and copper under the conditions of ASTM D 1384.

7. A method for freeze prevention with enhancement of cavitation erosion resistance and gap corrosion resistance, comprising: applying to a cooling system a composition comprising (a) a glycol-based anti-freezing agent; (b) cyclohexane dicarboxylic acid; and (c) non-reducing polyol selected from the group consisting of hexitol, pentitol, $C_{12}$ alcohols and their combination; wherein the cyclohexane dicarboxylic acid is one or a mixture of two or more selected from the group consisting of 1,4-cyclohexane dicarboxylic acid, 1,3-cyclohexane dicarboxylic acid, and 1,2-cyclohexane dicarboxylic acid.

8. The method of claim 7, further comprising at least one anti-corrosive agent selected from the group consisting of $C_4$-$C_{18}$ organic carboxylic acids and alkali salts thereof, phosphoric acids and phosphates thereof, azole derivatives and thiazole derivatives, and barium and barium compounds.

9. The method of claim 7, wherein the reducing polyol is sorbitol, xylitol, mannitol, or saccharose.

10. The method of claim 9, wherein the reducing polyol is mannitol.

11. The method of claim 7, wherein the composition prevents cavitation erosion of aluminum, cast iron, steel, brass, solder, and copper under the conditions of ASTM D 1384.

12. The method of claim 7, wherein the composition prevents gap corrosion of aluminum, cast iron, steel, brass, solder, and copper under the conditions of ASTM D 1384.

* * * * *